Nov. 22, 1938.　　　　F. W. DUNMORE　　　　2,137,241
AUTOMATIC STEERING SYSTEM
Filed March 3, 1936　　　　2 Sheets-Sheet 1
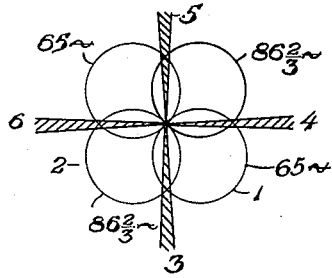
Fig. 1.
Fig. 2.
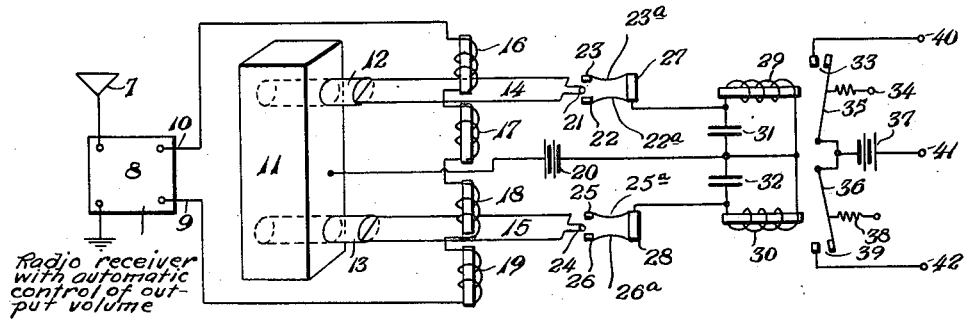
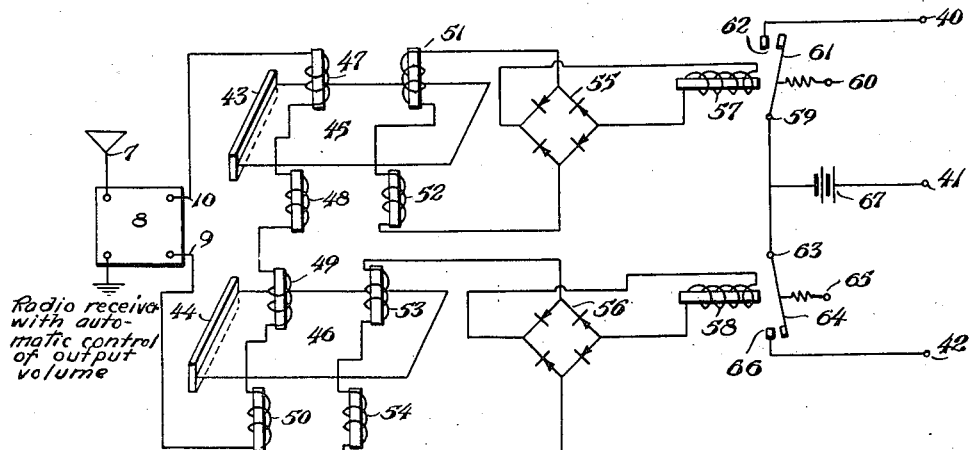
Fig. 3.
Inventor
Francis W. Dunmore
By J. F. Mothershead
Atty Nov. 22, 1938.  F. W. DUNMORE  2,137,241
AUTOMATIC STEERING SYSTEM
Filed March 3, 1936  2 Sheets-Sheet 2
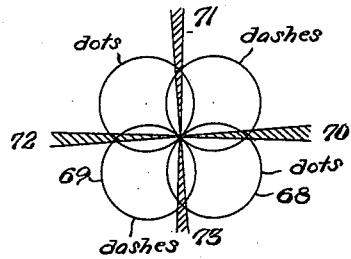
Fig. 4
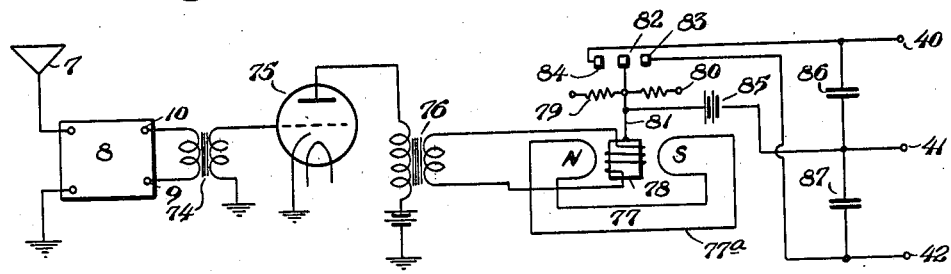
Fig. 5.
Fig. 6.
Inventor
Francis W. Dunmore
By J. B. Mothershead
Atty Patented Nov. 22, 1938

2,137,241

UNITED STATES PATENT OFFICE 2,137,241

AUTOMATIC STEERING SYSTEM

Francis W. Dunmore, Washington, D. C., assignor to Government of the United States of America, as represented by the Secretary of Commerce Application March 3, 1936, Serial No. 66,978

2 Claims. (Cl. 172—282)

(Granted under the act of March 3, 1883, as amended April 30, 1928; 370 O. G. 757)

The invention described herein, if patented, may be manufactured and used by or for the United States Government for governmental purposes without the payment of any royalty thereon.

This invention relates to means for holding a mobile object automatically on a radio beam course of the equisignal type, as for example the holding of an aircraft on a beam course, either for cross-country flying or blind landing.

An object of the invention is to operate lateral controlling elements of the mobile object, herein termed an aircraft, by a received radio beacon signal in such a way that the aircraft is automatically held within prescribed limits of the equisignal course. Heretofore it has been necessary for the pilot to operate the controls in accordance with the received equisignal course signals.

This invention is preferably, but not exclusively, associated with a radio range transmitter of the equisignal type and with a course-indicating device on the aircraft. The course indicator may be any one of many types which give an indication of the direction of deviation of the aircraft from the course. By means of electrically-controlled circuits actuated by the course-indicating element of the course indicator in accordance with this invention the lateral controlling elements of the aircraft may be made to function in a manner to return the aircraft to the course regardless of which way it deviates.

Other further objects of the invention will be apparent from the following detailed description and accompanying drawings. It is expressly understood, however, that these drawings are for the purpose of illustration only and are not designed for a definition of the limits of my invention. Referring to the illustrations, Fig. 1 shows diagrammatically the field pattern about a 4-course equisignal beacon of the double-modulation type.

Fig. 2 shows diagrammatically, for one embodiment of the invention, the employment of a tuned reed indicator for the double modulation beacon with relays actuated by contacts made by the vibrating reeds, the relays serving to operate the lateral controlling elements of the aircraft.

Fig. 3 shows diagrammatically, for another embodiment of the invention, the employment of a reed converter type of double-modulation beacon course indicator with the outputs operating relays which operate the lateral control mechanism of the aircraft.

Fig. 4 shows diagrammatically the field pattern of an equisignal beacon of the dot-dash type with the radiation characteristic and four equisignal courses.

Fig. 5 shows diagrammatically, for a third embodiment of the invention, the employment of a visual type of receiver for the dot-dash type of equisignal beacon with the visual indicator moving element operating relays for controlling the lateral controlling mechanism of the aircraft.

Fig. 6 shows one embodiment of that part of the invention by which the operation of the relays in Figs. 2, 3, and 5 may control the operation of the rudder of the aircraft in accordance with the deviation of the aircraft from the beacon course.

Referring to the drawings more in detail:

Fig. 1 represents the radiation characteristic produced by an equisignal beacon of the double-modulation type, where 1 is the figure-of-eight radiation modulated at one frequency, say 65 cycles and 2 is the figure-of-eight radiation characteristic modulated at another frequency, say 86⅔ cycles. The intersection of these two figure-of-eights produces the equisignal zones or courses 3, 4, 5, and 6 where the two modulating frequencies are present in equal amounts. In order to hold a plane automatically on any one of these courses in accordance with this invention, the illustrative arrangement shown in Fig. 2 may be used.

In the embodiment illustrated in Fig. 2, 7 is the antenna on the aircraft for picking up the beacon course signals shown in Fig. 1. 8 is the usual beacon receiver with audio output terminals 9 and 10, and with automatic volume control for holding a constant output signal. These two terminals supply the received 65-cycle and 86⅔-cycle modulation to the electromagnet driving coils 16 and 17 which actuate polarized reed 14, and to driving coils 18 and 19 which actuate polarized reed 15. Reed 14 is tuned to 65 cycles and reed 15 to 86⅔ cycles. Reed 14 is anchored at its fixed end through clamp 12 to base 11 and reed 15 is anchored at its fixed end through clamp 13 to base 11. Reed 14 carries an electrical contact 21 on its free end and reed 15 carries an electrical contact 24 on its free end. Contact 21 vibrates between contacts 22 and 23 and makes contact with them when reed 14 vibrates above a certain predetermined amplitude such as that obtained when off course in the 65-cycle zone some 1 or 2 degrees. Contact 24 vibrates between contacts 25 and 26 and makes contact with them when reed 15 vibrates above a certain predetermined amplitude such as that obtained when off course in the 86⅔-cycle zone some 1 or 2 degrees. Due to the fact that the receiver 8 is provided with automatic volume control, the sum of the 65 and 86⅔ cycle signals in the output remains constant, and only when the course is deviated from does one signal predominate over the other and reach a strength sufficient to impart enough amplitude to its tuned reed to close the contacts associated with it. Contacts 22 and 23 are anchored through springs 22a and 23a to base 27. The purpose of these springs is to prevent the tuned reed from becoming appreciably detuned when making contact with 22 and 23. Contacts 25 and 26 are carried on springs 25a and 26a for a like reason, these springs being anchored to base 28.

When contacts 21 and 22 or 21 and 23 close, battery 20 charges condenser 31 which in turn discharges through relay coil 29. When relay coil 29 becomes energized armature 35 is pulled toward coil 29 closing contact 33. 34 is a spring attached to armature 35 to open contact 33 when winding 29 is de-energized. When contact 33 closes, the voltage from battery 37 is put across terminals 40 and 41. Terminal 40 is connected to terminal 88, Fig. 6, and terminal 41 is connected to terminal 89, Fig. 6.

Referring to Fig. 6, there is provided a means 90a, herein, a magnetically-operated reversing switch, for reversing the motor 104a, herein by reversing the polarity of the excitation on its armature 105, so that the operation of switch 90a reverses the direction of rotation of the armature 105 of motor 104a. The voltage across terminals 88 and 89 excites coil 91 which pulls armature 96 toward it, closing contacts 97 and 95 and 99 and 98. This excites armature 105 with a polarity from battery 92 such that armature 105 revolves in a clockwise direction. Springs 102 and 103 serve to hold armature 96 in the central position when the coils 91 and 101 are not excited. Battery 92a excites field 104 of motor 104a. 106 is a timing device which allows the rotation of armature 105 to operate the gear reduction train 107, for 1 second every 10 seconds as long as armature 105 is rotating. The details of the timing device 106, form no part of the present invention. Any one of a great number of forms known in the mechanical movement art may be used, for example, that in which the driving shaft (that of armature 105 of reversible motor 104a) carries one element of a clutch capable of driving in either direction of rotation, and also drives a collateral gearing operating a timing cam or similar element which intermittently couples, with the driver carried clutch element, a cooperating clutch element carried by the shaft to be driven. Such a timer means, capable of operating in either direction of rotation of the driving and driven shafts, is shown, for example in the patent to A. E. Peters, No. 1,465,719 granted August 21, 1923.

In this Peters' patent the clutch "G" (Figs. 1 and 2 of Peters) is operable to drive its driven element "C" in either direction; the driving shaft "H" carries one element of this clutch, and also drives cam wheel 24—27 which, on rotation in either direction, reciprocates push rod 20—23 to rotate cam 10; this cam actuates lever 6 to periodically move member "C" to engage the driving clutch, and intermittently drive the driven shaft "D"; the cam 10 is shaped to engage the clutch "G" for about one-fifth of the time for each rotation of cam 10 and the cam wheel 24—27 makes two revolutions for each revolution of cam 10, wherefore the mechanism operates to drive shaft "D" about one second out of each ten seconds of operation of shaft "H".

Thus merely by connecting "H" of Peters to armature 105 of Fig. 6, herein, and "D" of Peters to gear train 107 herein, the desired timing interval is obtained. Gear train 107 operates bevel gear 108 which operates bevel gear 109 (herein shown as splined on shaft 109a, as illustrative of an arrangement for taking over of manual control) and thus rotates drum 110, which is suitably mounted, as by bearings 112. A clockwise rotation of armature 105 rotates drum 110 in a clockwise direction in the embodiment shown, in which control wires 113 and 114 are secured to drum 110 by suitable means 111. This unwinds control wire 113 from drum 110 and winds up control wire 114 on drum 110. This movement operates through arms 115 and 116 to rotate airplane rudder 117 on pivots 119 and 118 in a clockwise direction, thus turning the airplane to the left.

As above noted, the receiver 8 (Fig. 2) is provided with automatic volume control for holding a constant output signal. Thus with reference to course 3, Fig. 1, for example, the sum of the 65 cycle and 86⅔ cycle signals making up the output will be kept constant, each constituting about one-half the output strength when on course, but the 65 cycle signal building up to a greater part of the total strength as deviation occurs to the right, and the 86⅔ cycle signal building up to a greater part of the total strength as deviation occurs to the left. The total output level of the receiver 8 is set, as by the customary manual volume control, so that when on course, the signal strength imparts an amplitude of vibration to the reeds just under that needed to close the circuits controlled by them.

Thus when off course 3, Fig. 1, to the right, the 65-cycle signal predominates and the reed 14, Fig. 2, will operate as described and turn rudder 117 so that the airplane is turned to the left—the direction to bring it back on course. Rudder 117 (Fig. 6) turns only by a small amount each second it is operated. If after the end of the first 10 seconds the airplane has not returned to the course armature 105 will still be excited and rudder 117 will be turned a second time—the same amount as the first in the same direction. This will be kept up every 10 seconds until the airplane returns to the course and armature 105 becomes stationary. The timing element (on-off period) of timing device 106 (Fig. 6) may be adjusted to give the best operation. By this timing element my invention provides a new method of guarding against U-turning, horizontal spiralling, or figure-eighting across the course, as the turning of the rudder by small increments separated by lapses of time so restricts the rate of turning with reference to the rate of approach to the course as to insure return to the course with a heading which will direct the craft toward its destination.

Just as the airplane may be returned to the course when it deviates to the right, it may be returned in a like manner when it deviates to the left, since in this case reed 15, Fig. 2, being tuned to 86⅔ cycles will increase in amplitude when the plane goes off course 3 to the left into the 86⅔-cycle zone (Fig. 1) and contact 24 (Fig. 2) will touch 25 and 26 energizing relay coil 30 and closing contact 39 and putting a voltage across terminals 41 and 42. As 41 and 42 are connected to 89 and 90 (Fig. 6) respectively, reversing relay 90a will operate to reverse the current in armature 105 thus working through 106, 107, 108, 109 and 110 as before only in the opposite direction, so that rudder 117 is turned in a counter-clockwise direction thus turning the airplane to the right and tending to return it to the course.

In accordance with my invention it is contemplated that suitable means will be provided to enable manual control of the rudder to be taken over at any time by the pilot, such means being illustrated in Fig. 6, in which the bevel gear 109 is splined, as above mentioned, to the drum shaft 109a so that it may be shifted into or out of engagement with the bevel gear 108. This shifting, in the form shown, is accomplished by means of a shift collar 120 carried by the gear 109 and engaged by a shifter fork 121 pivoted at 122 and provided with means, such as detent 123, to hold it in engaged or disengaged position until shifted by movement of the shifter handle 124. When gear 109 is shifted into the position shown, rudder control by the beacon responsive means is provided for; when gear 109 is shifted out of engaging position, the rudder is freed from the automatic control, that it may be operated manually or otherwise by means of normal control elements, such as the control cables herein indicated diagrammatically in dotted lines at 125 and 126.

In Fig. 3 is shown a second illustrative embodiment of a method of control in accordance with this invention in which the contact on the vibrating reed is eliminated, and the moving reed caused to generate a voltage which, when rectified, is sufficient to operate a relay and control the aircraft. In this figure, 7, 8, 9 and 10 are as described in Fig. 2. Polarized reed 45 is tuned to 65 cycles and is actuated by driving coils 47 and 48. It is anchored at one end in base 43 and when in motion generates an alternating E. M. F. in pick-up coils 51 and 52. This alternating E. M. F. is rectified by full-wave oxide rectifier 55, the output of which energizes coil 57 which operates through armature 61 and contact 62 to put the voltage from battery 67 across terminals 40 and 41. These terminals are connected as in Fig. 2 to terminals 88 and 89 respectively and serve the same purpose to turn rudder 117 (Fig. 6) in a clockwise direction. Spring 60 on armature 61 is adjusted so that contact 62 will close when the output of 55 reaches a predetermined value such as that obtained when off course in the 65-cycle zone some 1 or 2 degrees.

Reed 46 (Fig. 3) is operated in a similar fashion by the 86⅔-cycle signal through driving coils 49 and 50 and serves to energize pick-up coils 53 and 54, the output of which, rectified by rectifier 56, energizes coil 58 closing contacts 66 of switch 63—66 when the tension of spring 65 is overcome, and thus energizing terminals 41 and 42. These terminals are connected to terminals 89 and 90 respectively (Fig. 6) which serves to operate rudder 117 in a counter-clockwise direction.

Obviously the springs 60 and 65 may be adjusted to a predetermined volume setting of receiver 8, or these springs may be adjusted to a normal tension and the total volume output of receiver 8 be then adjusted, as by the conventional manual volume control, to the proper setting to correspond to the tension selected. In either case, the automatic volume control of receiver 8 will maintain the adjusted relationship.

In Fig. 4 is shown another type of equisignal beacon where the figure-of-eight transmission 68 is coded with dots and the other figure-of-eight 69 is coded with dashes. These dots and dashes are interlocked so that a steady dash is heard on equisignal courses 70, 71, 72 and 73.

An illustrative embodiment of this invention for operating the aircraft control from the type of beacon shown in Fig. 4 is shown in Fig. 5. Here 7, 8, 9 and 10 are as described under Fig. 2. The output signal from 9 and 10 passes through audio transformer 74 through rectifier 75 and the primary of transformer 76, and any induced current in the secondary of transformer 76 energizes moving coil 78 of indicating instrument 77a. The pole pieces of magnet 77 of instrument 77a are so shaped that instrument 77a has maximum sensitivity when coil 78 is in the normal central position but is less sensitive the greater the angle of coil 78 from its normal position.

With this arrangement, when the aircraft is on course, as in the equisignal area 73 (Fig. 4), the dots and dashes merge into a steady continuous dash which, when rectified, produces no current change or interruption in the primary of transformer 76 sufficient to produce any current flow in the coil 78, so that the member 81 remains in central position.

When, however, the aircraft is off-course to the right of area 73 (Fig. 4) so that the dot signal predominates, the current build-up at the beginning of a dot exceeds the concurrent current drop at the end of the dash, producing a resultant current rise in the primary of the transformer 76. This current rise induces a current in the opposite direction in the secondary of the transformer 76, causing a current flow in the coil 78 in a direction to move the coil 78 counter-clockwise. The resultant current in the opposite direction due to current drop at the end of the predominating dot occurs just after the coil 78 has been turned to an insensitive position by the current rise, so that its tendency to return the coil clockwise is negligible in the proper slow acting instrument used. In this manner, a predominating dot signal functions only to throw the coil 78 in a counter-clockwise direction from the central position it tends to assume during the long interval of no effective current change in the primary of transformer 76, between dots.

Now, if the aircraft is off-course to the left of area 73 (Fig. 4) so that the dash signal predominates, the long interval of no effective change in primary current in the transformer 76 still occurs during the dash (i. e., between dots), and with the dashes predominating the current drop at the end of the dash exceeds the concurrent current rise at the beginning of the dot, producing a resultant effective current drop in the primary of the transformer 76. This current drop induces a current in the same direction (i. e., opposite in direction to the current induced by a primary current rise) in the secondary of the transformer 76, thus causing a current flow in the coil 78 in the direction to cause this coil to turn clockwise. The resultant current rise after the short dot interval, due to build-up of predominating dash current exceeding drop of dot current, occurs when the coil 78 has been turned clockwise to an insensitive position, so that its tendency to turn the coil counter-clockwise is negligible. In this manner, a predominating dash signal functions to throw the coil 78 in a clockwise direction, i. e., opposite to the direction it is thrown by a predominating dot signal.

The coil 78 and associated member 81 are urged into their normal central, sensitive position by springs 79 and 80, and with the instrument adjusted to respond sufficiently to the current resultants obtained when one or two degrees off course, the dot signals will close contacts 82 and 84 and the dash signals close contacts 82 and 83. Terminals 40 and 41 are therefore energized when the aircraft goes off course 73 (Fig. 4) to the right. Terminals 40 and 41 are connected to terminals 88 and 89 respectively and, when energized, serve to turn rudder 117 in a clockwise direction, thus turning the aircraft to the left.

When off course (in dash zone Fig. 4) to the left, the closing of contacts 82 and 83 energizes terminals 41 and 42, which are connected respectively to terminals 89 and 90, thus causing the airplane to turn to the right.

Condensers 86 and 87 serve to smooth out any rapid make and break at contacts 82 and 84 and 82 and 83 respectively.

In this Fig. 4 embodiment, I prefer to employ a receiver 8 with automatic volume control, but as in this case it is the differential between the concurrent falling and rising currents, rather than the absolute values thereof, which energizes the secondary of the transformer, the automatic volume control may be dispensed with.

While the drawings show electrical methods of control for operating the airplane rudder it is not intended to limit this invention to such methods of control, as modification of automatic pilot devices in accordance with this invention, for example, may be used to effect return of the aircraft to a radio beacon course.

It is further to be understood that this invention is applicable, for example, to holding an aircraft on a course in the lateral direction during the process of blind landing, or for other purposes, as well as to cross-country flying. The runway localizer beacon, for example, is a miniature of the radio range beacon and my invention is equally applicable to it.

Furthermore, it will be apparent from the foregoing illustrations that systems in accordance with this invention may be used to maintain a mobile object, as an aircraft, properly oriented with reference, not only to a lateral course, but to any course comprising a safety trace indicating the course to be followed, with different off-course signals of continuous, periodic, or occasional propagation, for indicating deviation from the safety trace in any direction.

What I claim is:

1. In a radio system for guiding aircraft on a radio beacon course of the double modulation type, means for receiving said radio beacon signals on said aircraft, means tuned to each of said modulations and associated with said receiving means, and means associated with said tuned means for operating the lateral controlling rudder of said aircraft, in response to the relative amplitudes of the modulated signals delivered to each of said tuned means when the aircraft deviates from the course, in such manner that said aircraft is turned at periodically altered rates separated by time intervals and in the direction to return it to the course, said rudder operating means comprising motor means continuously operated when the difference in amplitude between the modulated signals exceeds a given amount, and timing means connected between said motor and the lateral controlling rudder of said aircraft constructed to intermittently connect through to said rudder and disconnect therefrom the drive from said motor.

2. In a radio system for guiding aircraft on a radio beacon course of the interlocking equisignal dot-dash type, means for receiving said dot-dash signals on said aircraft, and means associated with said receiving means for differentiating between the dot and the dash signals and operating a rudder control mechanism of said aircraft in accordance with the relative amplitudes of said differentiations when off course, such that said rudder is turned in a direction to return the aircraft to said course, said last named means including timing means by which its operation of the rudder is caused to take place by increments of amount separated by time intervals of no change.

FRANCIS W. DUNMORE.